3,041,237
SYSTEMIC COMPOSITION FOR THE REDUCTION OF INFLAMMATION AND EDEMA AND METHOD OF ADMINISTERING
Donald A. Hoff and Alan R. Wagner, Columbus, Ohio, assignors to Warren-Teed Products Company, Columbus, Ohio, a corporation of Ohio
No Drawing. Filed Aug. 15, 1960, Ser. No. 49,446
14 Claims. (Cl. 167—51.5)

This invention relates to improvements in anti-inflammatory compositions and particularly those used in veterinary medicine and the methods for administering the same. The term veterinary as used in this specification pertains to all warm blooded animals exclusive of man.

Bruising, trauma and infection are frequently attended by inflammation and swelling. Where the inflammation is accompanied by infection, the treatment is sometimes more complex because the inflammation and edema interfere with the effectiveness of the anti-infective agent used. Where the inflammation and edema can be reduced or controlled, greater effectiveness is afforded by the anti-infective agent. Severe inflammation and swelling can incapacitate animals for long periods of time though actual infection is mild. Severe inflammation and edema also make areas affected more susceptible to serious infection.

It is an object of this invention to provide a quick, highly effective and safe systemic agent for use in medicine and particularly in veterinary medicine which will quickly reduce inflammation and edema in cases of trauma and infection.

It is a particular object of this invention to provide a composition effective in the treatment of bovine mastitis in cattle.

Another object of this invention is to provide an anti-inflammatory agent which can be used in conjunction with an anti-infective agent in order to improve the effect of the anti-infective agent. This is particularly important in the treatment of bovine mastitis, shipping fever, pneumonia and similar clinical entities in animal and man.

A further object of this invention is to provide a composition which can be safely administered parenterally and particularly intravenously.

Still a further object of this invention is to provide a hemostatic agent which is stable and not affected by severe changes in temperature.

Another object is to provide a composition which will reduce edema caused by complications of pregnancy, as for example in calving.

Another object is to provide a composition which will reduce infiltration of normal tissue by connective or scar tissue.

It is still another object of this invention to provide an anti-inflammatory agent which may be administered to pregnant animals without injury to the foetus.

It is a further object of this invention to provide a composition which will speed the recovery and particularly the recovery of productive animals such as dairy cows thereby to reduce losses in investment in these animals of time and money by improving appetite.

Another object of this invention is to provide an anti-inflammatory agent which is instantly ready for use without reconstitution.

Yet another object of this invention is to provide an anti-inflammatory agent which may be administered without deleterious effects to dogs, cats, rabbits, mice, cows, horses and other animals including young, middle-aged, and old animals.

It is still another object of this invention to provide an anti-inflammatory agent which may be administered simultaneously with a variety of other drugs or other medication without injurious effect.

A further object of this invention is to provide a method of administering an anti-inflammatory agent which is safe, simple and easily controlled as compared to other anti-inflammatory substances such as the corticosteroids which oftentimes interfere with function of the reticuloendothelial system and enhance the spread of infection.

These and other objects and advantages of this invention will be apparent from the following description and claims.

This invention comprises the administering of 7.0% n-butanol in doses of from 6 to 40 cc. per hundred weight per day and preferably from about 8 to 25 for a period of one to three days. The 7% n-butanol (v./v.) is administered in an isotonic aqueous solution having an adjusted pH of from 8 to 10.5. In such administration, it has been found that inflammation and swelling in cases of trauma and infection are rapidly reduced as compared with treatments heretofore known in the art. This is an unpredictable result since n-butanol is generally considered to be irritative to the mucous membranes and to produce dermatitis, headache, dizziness and drowsiness.

Particularly favorable results have been produced when n-butanol is used in conjunction with an anti-infective agent. The results are substantially above what might be expected when either is used singly or when both are used separately. Among those anti-infective agents which are compatible with n-butanol and which have proven to be safe when administered to the animal or human system and which are stable in an aqueous solution are: 4-homosulfanilamide hydrochloride (Marfanil or Mafenide hydrochloride), sulfadiazine, sulfamethazine, sulfaguanidine, sulfadimethoxine (Madribon), and the quaternary ammonium salts thereof.

Additionally, a carrier vehicle which tends to improve stability over extremely long periods of time is a composition comprising propylene glycol and water. An aqueous solution of about 20% propylene glycol gives the desired stability without producing any discomfiture or toxic effects on the animal when administered.

Sodium sulfite is added to the composition to act as an antioxidant for sulfa drugs and serves as a stabilizing agent to prevent deterioration. An amount not less than about 0.05% w./v. is recommended to act as a stabilizer.

Typical aqueous solutions are as follows:

*Example 1*

| n-Butanol | 7.0% (v./v.). |
|---|---|
| Sulfadimethoxine (Madribon) | 8% (w./v.). |
| Propylene glycol | 20% (v./v.). |
| Sodium sulfite | 0.05% (w./v.). |

Sodium hydroxide and sodium biphosphate adjusted to pH 8 to 10.5.

*Example 2*

| n-Butanol | 7.0% (v./v.). |
|---|---|
| 4 - homosulfanilamide hydrochloride (Marfanil) | 8 gm./100 cc. |
| Propylene glycol | 20% (v./v.). |
| Sodium sulfite | 0.05% (w./v.). |

Sodium hydroxide and sodium biphosphate adjusted to pH 8 to 10.5.

*Example 3*

| n-Butanol | 7.0% (v./v.). |
|---|---|
| Sulfadiazine | 8 gm./100 cc. |
| Propylene glycol | 20% (v./v.). |
| Sodium sulfite | 0.05% (w./v.). |

Sodium hydroxide and sodium biphosphate adjusted to pH 8 to 10.5.

Example 4

| | |
|---|---|
| n-Butanol | 7.0% (v./v.). |
| Sulfamethazine | 8 gm./100 cc. |
| Propylene glycol | 20% (v./v.). |
| Sodium sulfite | 0.05% (w./v.). |

Sodium hydroxide and sodium biphosphate adjusted to pH 8 to 10.5.

Example 5

| | |
|---|---|
| n-Butanol | 7.0% (v./v.). |
| Sulfaguanidine | 8 gm./100 cc. |
| Propylene glycol | 20% (v./v.). |
| Sodium sulfite | 0.05% (w./v.). |

Sodium hydroxide and sodium biphosphate adjusted to pH 8 to 10.5.

Example 6

| | |
|---|---|
| n-Butanol | 7.0% (v./v.). |
| The quaternary ammonium salt of sulfadiazine | 8 gm./100 cc. |
| Propylene glycol | 20% (v./v.). |
| Sodium sulfite | 0.05% (w./v.). |

Sodium hydroxide and sodium biphosphate adjusted to pH 8 to 10.5.

The above examples are illustrative of the sulfa compositions which can be used per 100 cc. of solution.

The above compositions are administered in amounts of from 6 to 40 cc. per hundred weight (hwt.) preferably. The adjusted pH of the solution is between 8 and 10.5.

A single treatment may be all that is necesary in a typical case; a series of two or more treatments will be found to be effective where the total average doses per cow runs between 4 to 40 gms. of the sulfa composition in a 7% solution of n-butanol. An average dose of 8 to 25 gms. of sulfa composition in a 7% solution of n-butanol is preferred.

While the invention has been described in connection with different embodiments thereof, it will be understood that it is capable of further modification, and this application is intended to cover any variations, uses or adaptations of the invention, in general, following the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. An anti-inflammatory, antiedematous, and anti-infective veterinary agent for warm blooded animals comprising an aqueous solution of about 7.0% (v./v.) n-butanol, and from about 4 to 40 grams per 100 cc. of a sulfa composition from the group consisting of:

4 homosulfanilamide hydrochloride
Sulfadiazine
Sulfamethazine
Sulfaguanidine
Sulfadimethoxine
Quaternary ammonium 4 homosulfanilamide
Quaternary ammonium sulfadiazine
Quaternary ammonium sulfamethazine
Quaternary ammonium sulfaguanidine
Quaternary ammonium sulfadimethoxine 2. An anti-inflammatory, antiedematous, and anti-infective veterinary agent for warm blooded animals comprising an isotonic aqueous solution of about 7.0% (v./v.) n-butanol, and from about 8 to 25 grams per 100 cc. of a sulfa composition from the group consisting of:

4 homosulfanilamide hydrochloride
Sulfadiazine
Sulfamethazine
Sulfaguanidine
Sulfadimethoxine
Quaternary ammonium 4 homosulfanilamide
Quaternary ammonium sulfadiazine
Quaternary ammonium sulfamethazine
Quaternary ammonium sulfaguanidine
Quaternary ammonium sulfadimethoxine 3. An anti-inflammatory, antiedematous, and anti-infective veterinary agent for warm blooded animals comprising an aqueous solution of about 7.0% n-butanol, and about 8 grams per 100 cc. of a sulfa composition from the group consisting of:

4 homosulfanilamide hydrochloride
Sulfadiazine
Sulfamethazine
Sulfaguanidine
Sulfadimethoxine
Quaternary ammonium 4 homosulfanilamide
Quaternary ammonium sulfadiazine
Quaternary ammonium sulfamethazine
Quaternary ammonium sulfaguanidine
Quaternary ammonium sulfadimethoxine 4. An anti-inflammatory, antiedematous, and anti-infective veterinary agent as in claim 1, and having a stabilizer in said aqueous solution comprising approximately 20% propylene glycol, and not less than about 0.05% w./v. sodium sulfite.

5. An anti-inflammatory, antiedematous, and anti-infective veterinary agent as in claim 2, and having a stabilizer in said aqueous solution comprising approximately 20% propylene glycol, and not less than about 0.05% w./v. sodium sulfite.

6. An anti-inflammatory, antiedematous, and anti-infective veterinary agent as in claim 3, and having a stabilizer in said aqueous solution comprising approximately 20% propylene glycol, and not less than about 0.05% w./v. sodium sulfite.

7. A veterinary method of reducing inflammation, edema, and infection in warm-blooded animals which consists in administering intravenously an aqueous solution of about 7.0% (v./v.) n-butanol, and from 4 to 40 grams per 100 cc. of a sulfa composition from the group consisting of:

4 homosulfanilamide hydrochloride
Sulfadiazine
Sulfamethazine
Sulfaguanidine
Sulfadimethoxine
Quaternary ammonium 4 homosulfanilamide
Quaternary ammonium sulfadiazine
Quaternary ammonium sulfamethazine
Quaternary ammonium sulfaguanidine
Quaternary ammonium sulfadimethoxine at the rate of 6 to 40 cc. per hwt.

8. A veterinary method of reducing inflammation, edema, and infection in warm blooded animals which consists in administering intravenously an aqueous solution of about 7.0% (v./v.) n-butanol, and from between 8 to 25 grams per 100 cc. of a sulfa composition from the group consisting of:

4 homosulfanilamide hydrochloride
Sulfadiazine
Sulfamethazine
Sulfaguanidine
Sulfadimethoxine
Quaternary ammonium 4 homosulfanilamide
Quaternary ammonium sulfadiazine
Quaternary ammonium sulfamethazine
Quaternary ammonium sulfaguanidine
Quaternary ammonium sulfadimethoxine at the rate of from between 6 to 40 cc. per hwt.

9. A veterinary method of reducing inflammation, edema, and infection as in claim 7 and wherein said solution has a stabilizer comprising approximately 20% propylene glycol and not less than about 0.05% w./v. sodium sulfite and having a pH of from about 8 to about 10.5.

10. A veterinary method of reducing inflammation, edema, and infection as in claim 8 and wherein said solution has a stabilizer comprising approximately 20% propylene glycol and not less than about 0.05% w./v. sodium sulfite and having a pH of from about 8 to about 10.5.

11. A veterinary method of treating animals for inflammation, edema, infection and the like which consists in administering parenterally an aqueous solution having an adjusted pH of between 8 and 10.5 of about 7.0% (v./v.) n-butanol, at the rate of 6 to 40 cc. per hwt.

12. A veterinary method of treating animals for inflammation, edema, infection and the like which consists in administering parenterally an aqueous solution of 7.0% (v./v.) n-butanol at the rate of 6 to 40 cc. per hwt, said solution having small amounts of sodium hydroxide and sodium biphosphate thereby adjusting the pH to from about 8 to about 10.5.

13. A veterinary method of reducing inflammation, edema, and infection as in claim 7, and wherein said solution has a stabilizer comprising approximately 20% propylene glycol and not less than 0.05% w./v. sodium sulfite, and small amounts of sodium hydroxide and sodium biphosphate for adjusting the pH of the solution from about 8 to about 10.5.

14. A veterinary method of reducing inflammation, edema, and infection as in claim 8, and wherein said solution has a stabilizer comprising approximately 20% propylene glycol and not less than 0.05% w./v. sodium sulphite, and small amounts of sodium hydroxide and sodium biphosphate for adjusting the pH of the solution from about 8 to about 10.5.

References Cited in the file of this patent

UNITED STATES PATENTS

| | | |
|---|---|---|
| 2,297,079 | Shonle | Sept. 29, 1942 |
| 2,369,711 | Blythe | Feb. 20, 1945 |
| 2,566,066 | Martin | Aug. 28, 1951 |
| 2,635,980 | Christenson | Apr. 21, 1953 |

OTHER REFERENCES

Smith: "J. Industrial Hygiene and Toxicology," June 1941, pages 259–261.